Dec. 27, 1966  W. W. BILLINGS ETAL  3,294,978
UNBALANCED CURRENT PROTECTION APPARATUS FOR
PARALLEL GENERATOR SYSTEMS
Filed Feb. 6, 1963
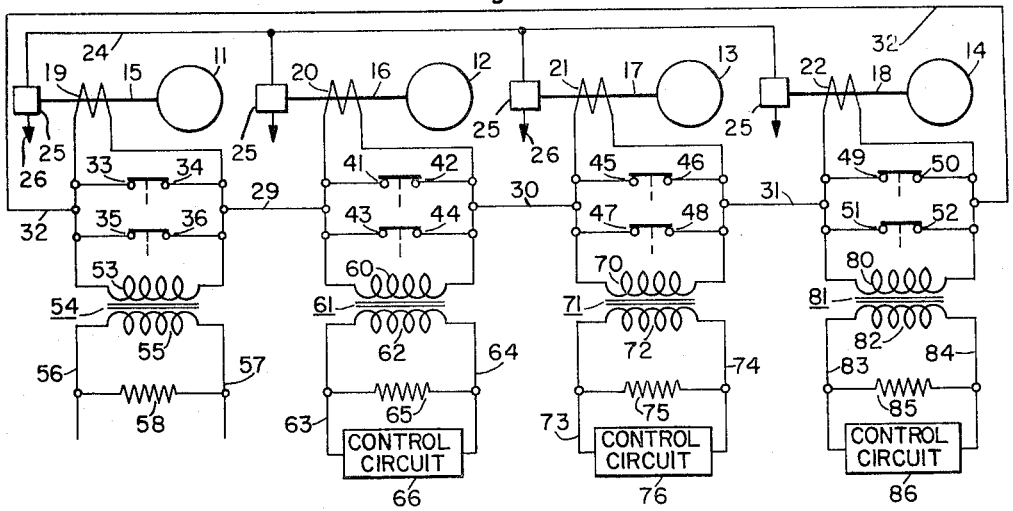
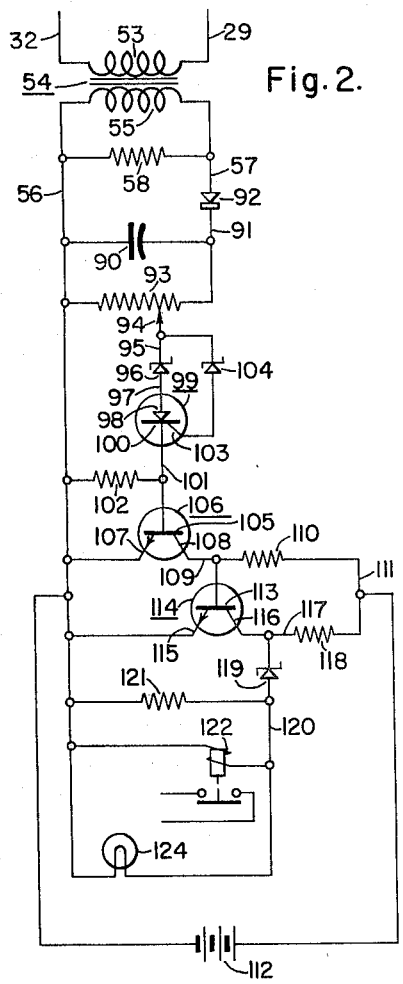
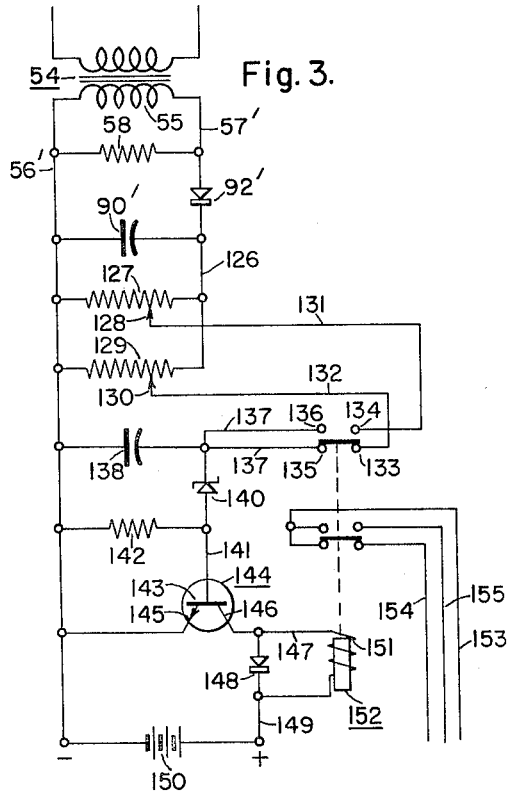
INVENTORS
William W. Billings
Otto L. Apfelbeck
BY *Maury I. Hull*
ATTORNEY United States Patent Office 3,294,978
Patented Dec. 27, 1966

3,294,978
UNBALANCED CURRENT PROTECTION APPARATUS FOR PARALLEL GENERATOR SYSTEMS
William W. Billings, Lima, and Otto L. Apfelbeck, Fort Shawnee, Ohio, assignors to Westinghouse Electric Corporation, Pittsburgh, Pa., a corporation of Pennsylvania
Filed Feb. 6, 1963, Ser. No. 256,696
13 Claims. (Cl. 307—84)

This invention relates to improvements in circuits and apparatus for providing unbalanced current protection for alternating current generators operating in a parallel system, and more particularly to a static circuit utilizing semiconductor devices and having substantially no moving parts for providing unbalanced current protection.

In prior art unbalanced current protection apparatus, the circuit employed to energize and deenergize a relay, to energize it for example at a specific level corresponding to the degree of unbalance representing an upper allowable limit, at which it is desired to disconnect the generator or give a warning signal, and to release the relay of the unbalanced current protection circuit at a lower level corresponding to a smaller difference between the output current of a particular generator and the mean current level, has been complicated and expensive, utilizing moving mechanical devices with their susceptibility to shock and failure from a number of causes.

The apparatus of the instant invention provides an improved circuit utilizing semiconductor devices for establishing the "on" and "off" limits for the unbalanced current protection corresponding to the values of current difference at which it is desired to energize and deenergize a relay, and overcomes the disadvantages of the prior art in this respect. In summary, the apparatus includes but is not limited to a Zener diode or diodes in conjunction with a transistor or transistors to allow the signal, warning, or control apparatus to "turn on" at a specific level and to "turn off" at a lower level. The Zener diodes control the energization and deenergization of a transistor and thereby an unbalanced current relay at signal amplitudes corresponding to their Zener voltages.

Accordingly, a primary object of the invention is to provide new and improved unbalanced current protection apparatus and circuit for use with paralleled generator systems.

Another object is to provide a new and improved static unbalanced current protection circuit.

A further object is to provide a new and improved static unbalanced current protection circuit utilizing Zener diodes for obtaining the "on" and "off" limits for the protection.

Still a further object is to provide a new and improved static unbalanced current protection circuit utilizing semiconductor devices and eliminating moving parts other than relays.

These and other objects will become more clearly apparent after a study of the following specification, when read in connection with the accompanying drawings, in which:

FIGURE 1 is a partial schematic electrical circuit diagram showing four alternating current generators and four current transformers connected in a loop for obtaining a loop current which is equal to the mean parallel generator current, and obtaining individual sensing voltages for the four generators;

FIG. 2 is a schematic electrical circuit diagram according to the preferred embodiment of the invention for obtaining the "on" and "off" voltage limits for the protection, and energizing and dropping out a relay at these limits; and FIG. 3 is a circuit diagram according to a second embodiment of the invention for actuating a relay at one voltage level corresponding to one value of current unbalance and dropping out the relay at a smaller voltage level corresponding to a second lower value of current unbalance.

Referring now to the drawings, in which like reference numerals are used throughout to designate like parts, for a more detailed understanding of the invention, and in particular to FIG. 1 thereof, there are shown four generators 11, 12, 13 and 14 having the output of one phase thereof symbolized by conductors 15, 16, 17 and 18, respectively, passing through the windings of current transformers 19, 20, 21 and 22 respectively. The generators are intended to be normally operated in parallel in a system such as that shown in a patent to N. F. Schuh et al., No. 2,885,569. For this purpose, a tie bus 24 may be provided and the generators are connected to the tie bus by circuit breaker means 25 which may include both generator circuit breakers and tie circuit breakers, if desired, as shown in the Schuh et al. patent. Loads may be connected to the system by leads 26 through the breaker means 25. A current transformer loop circuit is usually provided in such systems, to provide means for sensing load division between the generators, and the current transformers 19, 20, 21 and 22 are connected in such a circuit. A current loop is formed for the secondaries of all four current transformers including one terminal of winding 19, lead 29, winding 20, lead 30, winding 21, lead 31, winding 22 and lead 32, back to the other terminal of the aforementioned secondary winding 19. Connected between leads 32 and 29 are auxiliary contacts 33 and 34 of a generator control breaker for generator 11, and auxiliary contacts 35 and 36 for a bus tie circuit breaker for generator 11. Connected between leads 29 and 30 are auxiliary contacts 41 and 42 of a generator control breaker for generator 12, and auxiliary contacts 43 and 44 of a bus tie breaker. Connected between leads 30 and 31 are auxiliary contacts 45 and 46 of a generator control breaker for generator 13, and auxiliary contacts 47 and 48 of a bus tie breaker. Connected between leads 31 and 32 are auxiliary contacts 49 and 50 of a generator control breaker for generator 14, and auxiliary contacts 51 and 52 of a bus tie breaker. It will be understood that these various contacts are auxiliary contacts associated with the respective circuit breaker means 25 and adapted to close when the associated breaker opens. The auxiliary contacts function to bypass the associated current transformer when the corresponding generator is disconnected from the system, thus removing the current transformer from the loop circuit in a well known manner, as illustrated for example in Flugstad, Patent 2,829,278 and King et al. Patent 2,840,725.

The aforementioned contacts provide for bypassing the sensing circuit of an unparalleled generator. The sensing circuit of generator 11 includes the primary 53 of a transformer generally designated 54, primary 53 having the terminals thereof connected to leads 32 and 29, the secondary 55 having leads 56 and 57 connected to the terminals thereof, across which there is connected a sensing resistor 58. The sensing circuit of generator 12 includes the primary 60 of a transformer generally designated 61, the terminals of primary 60 being connected to leads 29 and 30, the secondary 62 of transformer 61 having the terminals thereof connected to leads 63 and 64, across which is connected the sensing resistor 65 and a control and/or signalling circuit shown in block form at 66. The sensing circuit for generator 13 includes the primary 70 of a transformer generally designated 71, the terminals of primary 70 being connected to leads 30 and 31, the secondary 72 of the transformer 71 having leads 73 and 74 connected thereto, across which is connected the sensing resistor 75 and a control circuit 76 shown in block form. The sensing circuit for the aforementioned generator 14 includes the primary 80 of a transformer generally designated 81, the terminals of the primary 80 being connected to leads 31 and 32, the secondary 82 of transformer 81 having leads 83 and 84 connected thereto, across which is connected the sensing resistor 85 and a control circuit 86 shown in block form. The control circuits 66, 76 and 86 may be similar to the circuit of FIGS. 2 or 3, depending upon the embodiment of the invention employed.

FIG. 1 shows the unbalanced current sensing circuit for a four parallel generator system. It should be understood that the number four for the generators is chosen by way of illustration, and the invention is not limited to the use of four generators. Current transformers in one phase of each generator provide currents in their secondaries proportional to the generator currents. It can be shown mathematically by well known formulas that the loop current in lead 32 is equal to the mean parallel generator current, and further that the sensing voltages for generators 11, 12, 13 and 14 developed across resistors 58, 65, 75 and 85, respectively, are proportional to the vector difference of their respective generator output current and the mean of the paralleled generator output currents. It will be understood that the circuit is made as accurate as possible as to sensing voltage by winding accuracy of the transformer, accuracy of the transformer exciting current, and maintaining close tolerance of resistance value for the sensing resistors 58, 65, 75 and 85. As previously stated, auxiliary contacts on the system generator control breakers and bus tie breakers would bypass the sensing circuit of an unparallel generator. These breakers might be operated manually by an operator in response to a signal indication that an unbalanced current condition existed, or they may be operated automatically in accordance with well known practices. Thus, the circuit will, in the embodiments shown, provide unbalanced current sensing voltages when from two to four generators are paralleled.

Particular reference is made now to FIG. 2, which shows a circuit according to one embodiment of the invention, the circuit of FIG. 2 providing an output signal only when an unbalanced current condition equal to or greater than a certain value exists, and at all other times the output signal is zero. This output signal may result in the energization of a relay winding 122, or the energization of a signal lamp 124, or both, as will be explained more fully hereinafter. Hence, this unbalanced current signal may be used to initiate unbalanced current protection action such as opening a circuit breaker in response to energization of the relay winding 122. As previously stated, the circuit of FIG. 2 employs Zener diodes and other semiconductor devices in a novel circuit arrangement for establishing the "on" and "off" limits for the protection, for actuating a relay when the degree of unbalance attains a first predetermined value or reaches a predetermined limit, and causing the relay to become deenergized or to drop out when the degree of unbalance is reduced to a second predetermined value. It should be understood that whereas for simplicity of illustration the circuit of FIG. 2 shows the indicator and control circuit for only one of the generators 11, that each of the other generators 12, 13 and 14 is provided with its own circuit similar to the circuit of FIG. 2, these being represented by blocks 66, 76 and 86.

In FIG. 2, leads 56 and 57, in addition to the resistor 58, have connected thereacross in series the capacitor 90, lead 91 and rectifier 92. Lead 91 is connected to one terminal of a potentiometer 93 having the other terminal thereof connected to lead 56. The arm 94 of potentiometer 93 is connected to lead 95, Zener diode 96, lead 97 and thence to one power element 98 of a controlled rectifier generally designated 99 having the cathode or other power element 100 thereof connected to lead 101 and thence by way of resistor 102 to the aforementioned lead 56. Connected between the control element 103 of the aforementioned controlled rectifier 99 and the aforementioned lead 95 is an additional Zener diode 104.

The aforementioned lead 101 is connected to the base 105 of a transistor generally designated 106 having the emitter 107 thereof connected to lead 56 and having the collector 108 thereof connected by way of lead 109, resistor 110, and lead 111 to the positive terminal of battery 112, and thence through the negative terminal of the battery to the aforementioned lead 56. The battery or other source of direct current potential 112 is provided for reasons which will be hereinafter more clearly apparent. The aforementioned lead 109 is connected to the base 113 of an additional transistor generally designated 114, having the emitter 115 thereof connected to lead 56, and having the collector 116 thereof connected by way of lead 117 and resistor 118 to the aforementioned lead 111. Lead 117 is further connected by way of the Zener diode 119, lead 120 and resistor 121 to the aforementioned lead 56. Lead 120 is connected to one terminal of the winding 122 of a relay, the winding having the other terminal thereof connected to the aforementioned lead 56. Indicating lamp 124 is connected between lead 120 and lead 56.

In the operation of the circuit of FIG. 2, the turns ratio of the transformer 54 is selected so that for the magnitude of primary current occurring at the stipulated UC (unbalanced current) limit, the sensing voltage across the resistor 58 will be sufficient to actuate the unbalanced current circuit (energize relay winding 122 and lamp 124). Neglecting the magnetizing current, the voltage across the resistor 58 is given by the formula $$V = I_1 \frac{N_1}{N_2} R$$

where:

$I_1$ = current in primary 53
$N_1$ = turns in primary 53
$N_2$ = turns in secondary 55
$R$ = resistance value of resistor 58.

Nearly the positive peak value of the alternating current voltage across resistor 58 appears across the potentiometer 93, the voltage being rectified by the rectifier 92 and filtered by the capacitor 90. Preferably, the resistance value of potentiometer 93 is made many times larger than the resistance value of 58 so as not to affect the accuracy of the loops or circuits. As previously stated, the circuit is designed to have relay winding 122 energized at a specified magnitude of unbalance current, that is, when the vector voltage difference attains at least a predetermined value, and hold or remain energized until the unbalance current or vector difference in voltage decreases to or below a specified value, indicating that the generator is now ready to assume its normal load. The unbalance voltage ratio of actuate to dropout for the relay may be of the order of 2:1. The Zener diode 104 is selected to break down at a first unbalance voltage corresponding to the unbalance current level at which it is desired to give an indication and perhaps drop out the generator. When Zener diode 104 breaks down it causes a gate signal to be applied to the control element 103 of the controlled rectifier 99, causing the controlled rectifier to become in a conductive condition. By selection, the breakdown voltage of the Zener diode 96 is made less than the breakdown voltage of the Zener diode 104, and as a result the Zener diode 96 is broken down before or at substantially the instant that a control potential is applied to control electrode 103; controlled rectifier 99 becomes conductive and base current flows into the base 105 of the transistor 106. The breakdown voltage of the controlled rectifier 99 is greater than the breakdown voltage of the Zener diode 104; the controlled rectifier accordingly begins to conduct only after the Zener diode 104 has broken down. The arm 94 of potentiometer 93 is adjusted to a position to make the controlled rectifier 99 conductive at the specified or desired magnitude of unbalance current in accordance with the desired "on" limit.

Prior to the application of a signal to base 105 of transistor 106, that is, while the controlled rectifier 99 is non-conductive, the transistor 106 has no base signal and is non-conducting. While this condition exists, current flows from the direct current supply voltage 112 through the resistor 110 and on to the base 113 of transistor 114. As a result, the transistor 114 conducts, the collector current flowing through the resistor 118, so that the only voltage appearing on the lead 117 with respect to lead 56 is a small voltage drop representing the drop across the transistor 114 at saturation. This voltage drop is insufficient to break down the Zener diode 119, so that no voltage appears across the winding 122 of the relay.

Assume now by way of description that the signal from controlled rectifier 99 is applied to base 105 of transistor 106. Transistor 106 conducts and the voltage drop thereacross falls to a very low value reducing the potential between leads 109 and 56, and reducing the potential on the base 113 of the transistor 114 to a very small value so that transistor 114 is no longer conductive. The voltage on lead 117 with respect to lead 56 rises to a high value, the Zener diode 119 breaks down, and current flows through Zener diode 119, resistor 118, and winding 122, energizing the coil 122 and causing the relay to be actuated. At the same time signal lamp 124 is energized.

Assume now by way of description that generator 11 is additionally excited or altered in some other way so that the vector difference between the current output of generator 11 and the mean current of the other generators is reduced substantially, so that the voltage across the potentiometer 93 is reduced. As the magnitude of the unbalance decreases, the voltage at the arm 94 reaches or passes below the breakdown voltage or Zener voltage of Zener diode 96. Zener diode 96 becomes less conductive or substantially ceases to conduct. The current through the controlled rectifier 99 will decrease below its holding current, and the controlled rectifier 99 will become non-conductive. When this happens the signal is removed from the base 105 of transistor 106, transistor 106 ceases to conduct, transistor 114 becomes conductive and the voltage between lead 117 and lead 56 falls to a very low value; the voltage across coil 122 falls to substantially zero with the result that the coil is deenergized and lamp 124 is deenergized. By suitable choice of component values and circuit parameters, transistor 114 can be made to become conductive at a voltage at arm 94 corresponding to the "off" limit of current unbalance.

There has been provided then apparatus in which the "on" to "off" ratio is statically controlled, the circuit of FIG. 2 providing for the energization of relay winding 122 when the vector difference between the current output of generator 11 and the mean current of the generators attains at least a first predetermined value, and causing the deenergization of the winding 122 of the relay when the vector difference becomes less by a second predetermined amount, indicating that the generator is now in a condition to assume part of the load of the system.

In choosing components for use in the circuit of FIG. 2, Zener diode 104 may be a type known in the trade as a Continental Device Corporation number CD 32,466 rated at 15 volts plus or minus 5 percent at 0.05 milliampere; Zener diode 96 may be a Continental Device Corporation number CD 32,463 rated at 8.2 volts plus or minus 5 percent at 0.05 milliampere; controlled rectifier 99 may be a type known in the trade as a 2N1871 rated at 60 volts anode breakdown, 0.2 milliampere gate current to fire, 1.0 milliampere typical drop-out current; resistor 102 may have a value of 2,500 ohms; and transistor 106 may be a type known in the trade as a 2N338.

Certain circuit conditions are met by use of the above-mentioned components, but these circuit conditions could be met by other components. It will be understood that a certain small current flows through Zener diode 104 before breakdown; this current flows through the control element-cathode (103-100) path of rectifier 99, and produces a voltage drop across resistor 102. This voltage drop, or current gate, should be less than the threshold voltage of transistor 106 so that transistor 106 will not be turned on before controlled rectifier 99 starts to conduct. The breakdown voltage of controlled rectifier 99 should be greater than that of Zener diode 96. The holding current of the controlled rectifier 99 should be greater than the leakage current of Zener diode 96. There should be sufficient impedance in the controlled rectifier circuit to limit current to safe values for transistor 106. The ripple frequency component of voltage should be kept low so that ripple will not trigger the controlled rectifier.

Particular reference is made now to FIG. 3, which shows a second embodiment of the invention. In FIG. 3 the secondary 55 has the output leads 56' and 57' thereof connected to the aforementioned resistor 58, lead 57' being connected by way of rectifier 92', lead 126 and capacitor 90' to the aforementioned lead 56'. The rectifier 92' and capacitor 90' perform the same purpose as in FIG. 2. However, it will be noted that the capacitor 90' in FIG. 3 has two potentiometers 127 and 129 connected thereacross, so that the rectifier 92' and the capacitor 90' may have, if desired, somewhat different characteristics or capacities than their counterparts in the circuit of FIG. 2. The arm 128 of potentiometer 127 and the arm 130 of potentiometer 129 are connected by leads 131 and 132 respectively to the contacts 134 and 133 respectively of a relay 152 connected in a manner to form a single-pole, double-throw switch. Contact 135 and contact 136 are connected together; contact 135 which cooperates with contact 133, is connected by lead 137 and capacitor 138 to the aforementioned lead 56', lead 137 also being connected to contact 136. Lead 137 is connected by way of Zener diode 140, lead 141 and resistor 142 to the aforementioned lead 56'. Lead 141 is connected to the base 143 of a transistor generally designated 144 having the emitter 145 thereof connected to lead 56' and having the collector 146 thereof connected by way of lead 147, rectifier 148, lead 149 and battery 150 to the aforementioned lead 56'. The aforementioned leads 147 and 149 have the winding 151 of the relay generally designated 152 connected thereacross, to be energized by the collector current of transistor 144. The relay has an additional set of single-pole, double-throw contacts, to which there are connected the common lead 153 and other individual leads 154 and 155, lead 153 being alternately connected to lead 154 or lead 155 in accordance with the energization or deenergization of the relay.

In the operation of the apparatus of FIG. 3, the winding 151 of the relay generally designated 152 is normally deenergized, so that the circuit is closed between contacts 133 and 135. The arm 130 of potentiometer 129 is adjusted to a position whereat the voltage applied to the Zener diode 140 through resistor 142 causes the Zener diode 140 to break down when the vector difference in the currents in transformer 54 attains at least a certain predetermined amplitude. When the Zener diode 140 breaks down, a signal is applied to the base 143 of transistor 144, and current flows at the base causing the transistor to become conductive, and causing the coil 151 of relay 152 to be energized. The energization of the relay disconnects lead 137 and Zener diode 140 from potentiometer arm 130 and connects lead 137 by way of relay contacts 136–134 to the arm 128 of the potentiometer 127. The arm 128 is adjusted to a position whereat the Zener diode 140 will substantially cease to conduct when the magnitude of the unbalanced current is at the dropout or second predetermined level, that is, when the vector difference in currents falls to a certain predetermined amount, resulting in a fall in the voltage across the potentiometer 127. The small capacitor 138 is provided to prevent relay chattering upon closing of the circuit. The leads 153, 154 and 155 are connected to those relay contacts which control the operation of the unbalanced current regulatory portion of the circuit, which may include a signal lamp similar to lamp 124.

There have been provided then two embodiments of apparatus well suited to accomplish the aforedescribed objectives of the invention, that is, the sensing of unbalanced current in a parallel generator system, giving a first indication when the unbalance attains a first predetermined magnitude, and giving a second indication when the unbalance falls to a second predetermined magnitude less than the first magnitude. One embodiment is completely static, and the other uses static sensing to actuate the relay. Both can be calibrated or readily adjusted to give a warning signal or actuate a breaker at a specified magnitude of unbalanced current and hold in until the unbalanced current is reduced to or becomes less than a specified level.

The term "utilization circuit" as employed herein and in the claims appended hereto means any indicating, signal, warning, or control circuit, or circuit for actuating a breaker.

In the circuit of FIG. 2, the transistor stage including transistor 114 may be used to provide a positive logic signal during the unbalanced current condition. If desired, transistor 114 and associated components may be omitted, and the winding of relay 122 could be substituted for resistor 110 as a collector load device for transistor 106, suitable choice of a transistor, amplitude for the potential at source 112, and resistance value for the relay winding being made.

Whereas the invention has been shown and described with respect to two exemplary embodiments thereof which give satisfactory results, it should be understood that changes may be made and equivalents substituted without departing from the spirit and scope of the invention.

We claim as our invention:

1. In an unbalanced current protection system for use with a plurality of paralleled generators, in combination, signal generating means operatively connected to all of said generators for obtaining a signal which varies in amplitude in accordance with variations in the current difference between the current supplied by one generator and the mean of the currents supplied by all of the generators, a circuit adapted to have energized and deenergized conditions, and semiconductor switching means connecting said circuit to the signal generating means for switching the circuit between energized and deenergized conditions in accordance with variations in the signal generated by the signal generating means from a first amplitude to a second amplitude corresponding respectively to a first current difference and a second current difference.

2. An unbalanced current protection system for use with a plurality of paralleled generators for switching a utilization circuit between energized and deenergized conditions in accordance with variations in the current deviation between the current supplied by one of said generators and the mean of the currents supplied by all of said generators comprising, in combination, signal generating means operatively connected to all the generators for generating a signal which varies in amplitude in accordance with variations in said current difference, relay means including a winding and contacts, said contacts controlling said utilization circuit, and circuit means including a transistor, a source of energizing potential and a Zener diode operatively connecting said winding to said signal generating means for energizing the winding when said signal has a first predetermined value and for deenergizing the relay winding when said signal has a second predetermined value different from said first predetermined value.

3. In an unbalanced current protective system for use with a plurality of paralleled generators including a first generator, signal generating means operatively connected to all the generators for providing a signal of a first predetermined amplitude when the difference between the current supplied by said first generator and the mean of the currents supplied by all of the generators attains at least a first predetermined value, and for generating a signal of a second predetermined amplitude when the difference between the current supplied by the first generator and the mean of the currents supplied by all of the generators falls to a second predetermined value less than the first value, a utilization circuit including a source of energizing potential, transistor means operatively connected to the utilization circuit for switching the utilization circuit between energized and deenergized conditions in accordance with variations in the condition of the transistor means between conductive and non-conductive states, and circuit means including a semiconductor device connecting the transistor means to the signal generating means for selectively rendering the transistor means conductive and non-conductive in accordance with variations in the signal between one amplitude and the other amplitude of said first and second amplitudes.

4. An unbalanced current protective system for use with a plurality of paralleled generators including a first generator, for energizing a utilization and indicating circuit when the difference in the current supplied by the first generator and the mean of the currents supplied by all the generators attains at least a first predetermined value and for deenergizing the utilization circuit when the difference between the current supplied by the first generator and the mean of the currents supplied by all of the generators falls to a second predetermined value smaller than said first value comprising, in combination, signal obtaining means connected to all the generators for obtaining a signal which is proportional in amplitude to the difference between the current of the first generator and the mean of the currents supplied by all the generators and which provides a first signal value corresponding to the first value of current difference and which provides a second signal value corresponding to the second value of current difference, transistor means having alternate conductive and non-conductive conditions, said transistor means being operatively connected to said utilization circuit and controlling the energization of the utilization circuit in accordance with the instant condition of the transistor means, and circuit means including Zener diode means operatively connecting the transistor means to the signal obtaining means for switching the transistor means between conditions when said signal attains said first value and for again switching the transistor means between conditions when the signal falls to said second predetermined value.

5. Unbalanced current protection apparatus for use with a plurality of paralleled generators including a first generator for energizing a utilization circuit when the difference in the current supplied by said first generator differs by at least a first predetermined value from the mean of the currents supplied by all the generators and for deenergizing said utilization circuit when the difference between the current of the first generator and the mean of the currents supplied by all the generators falls to a second predetermined value smaller than said first value comprising, in combination, means operatively connected to all the generators for generating a signal which is proportional in amplitude to the difference between the current of the first generator and the mean of said generator currents, means including energizing means and switching means having first and second switching conditions operatively connected to the utilization circuit for energizing the utilization circuit while the switching means is in a first condition and deenergizing the utilization circuit while the switching means is in the second condition, and circuit means connecting the switching means to the signal generating means for causing the switching means to assume the first condition when the signal attains at least a predetermined first amplitude corresponding to the first predetermined value of current difference and for causing the switching means to assume the second condition when the signal falls to a second predetermined amplitude corresponding to the second predetermined value of current difference.

6. In apparatus for use with a plurality of generators for giving a first indication when the current of one generator deviates from the mean current of all of the generators by a first predetermined amount and for giving a second indication when the current of said one generator deviates from the mean current of all the generators by a second predetermined amount less than the first amount, comprising, in combination, voltage obtaining means operatively connected to all the generators for obtaining an unbalance voltage proportional in amplitude to the current deviation between the output current of one generator and the mean output current of all the generators, relay means, circuit means including a transistor and a source of energizing potential connected to the relay means for energizing the relay means when the transistor is non-conductive and deenergizing the relay means when the transistor is conductive, and other circuit means including first and second Zener diodes connecting the transistor to the voltage obtaining means, said rfist Zener diode having a voltage breakdown potential corresponding to the amplitude of the unbalance voltage when the difference between the one generator current and the means generator current is of the first predetermined amount and is such that it is desired to operate the relay means to give a first indication, the other circuit means rendering the transistor non-conductive when the first Zener diode breaks down, the second Zener diode having a breakdown voltage less than that of said first Zener diode, the voltage breakdown potential of the second Zener diode corresponding to the amplitude of the unbalance voltage when the difference between the one generator current and the mean generator current is of the second predetermined amount and is such that it is desired to operate the relay means to give a second indication, the other circuit means rendering the transistor conductive when the second Zener diode breaks down.

7. An unbalanced current protection system for use with a plurality of generators for energizing a circuit when the difference between one generator current and the mean current of all of said generators reaches at least a first predetermined value and deenergizing said circuit when the difference between said one generator current and the mean current of all the generators falls to a second value lower than said first value comprising, in combination, a utilization circuit adapted to be selectively energized and deenergized, circuit means including a source of direct current energizing potential and a transistor having an emitter, base and collector, means including a Zener diode connecting the utilization circuit across the emitter and collector of said transistor, said transistor while conducting having a small voltage drop thereacross insufficient to break down the Zener diode, said transistor while nonconductive having a high voltage drop thereacross which breaks down the Zener diode and energizes the utilization circuit, means connected to all the generators for obtaining a signal which is proportional in amplitude to the vector difference between the current in said one generator and the mean current of all the generators, and additional circuit means including a controlled rectifier connecting the signal obtaining means to the base of said transistor whereby said transistor is rendered non-conductive when the signal attains a first amplitude corresponding to said first unbalanced current value and said transistor is rendered conductive when the signal falls to a second amplitude corresponding to the second value of the unbalanced current.

8. An unbalanced current indication system for use with a plurality of paralleled generators including a first generator for energizing a utilization circuit when the difference between the current supplied by the first generator and the mean of all of the currents supplied by all the generators attains at least a first predetermined value, and for deenergizing said utilization circuit when the difference between the current supplied by said first generator and the mean current of all of the generators falls to a second value smaller than said first value, comprising, in combination, circuit means interconnecting all said generators, means connected to said first generator for obtaining a signal which is proportional in amplitude to the difference in current and which has a first signal amplitude corresponding to the first value of current difference and which has a second signal amplitude corresponding to the second value of current difference, controlled rectifier means, first Zener diode means operatively connecting the controlled rectifier means to the signal obtaining means for rendering the controlled rectifier means conductive when the signal attains said first amplitude, second Zener diode means connecting the controlled rectifier means to the signal obtaining means for rendering the controlled rectifier means non-conducting when said signal falls to said second amplitude, other circuit means including a source of potential and a transistor having an emitter, collector and base, third Zener diode means connecting the utilization circuit across the emitter and collector of the transistor, said transistor while conductive having a small voltage drop thereacross insufficient to break down the third Zener diode means and cause current to flow through the utilization circuit, said transistor while non-conductive having a high voltage drop thereacross which breaks down the third Zener diode means and causes current to flow through the utilization circuit, and further circuit means connecting said transistor to said controlled rectifier means whereby said transistor is rendered non-conductive when the controlled rectifier means is passing a signal and said transistor is rendered conductive when the controlled rectifier means is not passing a signal.

9. In combination in an electrical circuit having a first circuit point and a second circuit point with a potential of predetermined polarity normally existing between the two points, a first Zener diode, a controlled rectifier having an anode, cathode, and control element, the first Zener diode and controlled rectifier being connected in series between the first circuit point and the second circuit point whereby while the first Zener diode is broken down and the controlled rectifier is conductive a current path is provided through the first Zener diode and through the anode-cathode path of the controlled rectifier between the first circuit point and the second circuit point, and a second Zener diode connecting the control element of the controlled rectifier to the first circuit point, the second Zener diode having a higher voltage breakdown rating than the first Zener diode, both said Zener diodes breaking down when the potential difference between the first circuit point and the second circuit point attains at least a first value, the second Zener diode rendering the controlled rectifier conductive and permitting the passage of current from the first circuit point to the second circuit point by way of the first Zener diode when the potential difference attains said first value, the controlled rectifier becoming non-conducting when the potential difference between the first circuit point and the second circuit point falls to a second value less than the first value and corresponding substantially to the breakdown potential of the first Zener diode, thereby causing the cessation of current flow from the first circuit point to the second circuit point.

10. An unbalanced current protective system for use with a plurality of paralleled generators for energizing a utilization circuit when the difference between the current supplied by a first generator differs from the mean current supplied by all the generators by a first predetermined amount and for deenergizing the utilization circuit when the difference between the current supplied by the first generator and the mean of the currents supplied by all of the generators falls to a second predetermined amount less than said first amount comprising, in combination, signal generating means including a transformer operatively connected to all the generators for generating a signal which varies in amplitude in accordance with variations in the difference between the current supplied by the first generator and the mean of the currents supplied by all of the generators, means connected to the signal generating means for obtaining a voltage having first and second amplitudes corresponding to the first and second amounts of current difference, transistor means adapted to be energized by a voltage of the first amplitude and deenergized by a voltage of the second amplitude, relay means and a source of potential connected in circuit with the transistor means for controlling the utilization circuit, and Zener diode means connecting the transistor means to the means for obtaining voltages of first and second amplitudes, said Zener diode means breaking down upon the application thereto of the voltage of first amplitude and causing the transistor means to conduct and the relay means to be energized, said Zener diode means being restored to a non-conductive condition by the application thereto of said voltage of second amplitude whereupon said transistor means ceases to conduct and the relay means is deenergized.

11. An unbalanced current protective system for use with a plurality of paralleled generators for providing an indication when the current supplied by one generator differs by a predetermined amount from the mean of the currents supplied by all of the generators and for providing a second indication when the current supplied by said one generator differs by a second predetermined amount from the mean of the currents supplied by all of the generators, said first predetermined amount being greater than said second predetermined amount, comprising, in combination, signal generating means electrically connected to all the generators for providing a signal which varies in amplitude in accordance with variations in the difference between the current supplied by the first generator and the mean of all the currents supplied by all of the generators, circuit means including first and second potentiometers each having an arm and a Zener diode operatively connected to the signal generating means, the Zener diode breaking down and becoming conductive at a first predetermined signal amplitude in accordance with the setting of the arm of the first potentiometer, the Zener diode becoming non-conductive at a second predetermined signal amplitude in accordance with the setting of the arm of the second potentiometer, transistor means electrically connected to the Zener diode and being switched between conductive and non-conductive conditions in accordance with changes in the Zener diode between conductive and non-conductive conditions, and relay means connected to the transistor means to be controlled thereby for controlling the utilization circuit.

12. In an unbalanced current protection system for use with a plurality of paralleled generators, in combination, a plurality of current transformers for the corresponding phases of the plurality of generators respectively, circuit means connecting the secondaries of all of the current transformers in series to form a closed loop having a current therein which is substantially equal to the mean parallel generator current, a plurality of other transformers each having a primary and a secondary, means connecting the primaries of the other transformers across the secondaries of the current transformers respectively, the secondaries providing sensing voltages which are proportional to the vector difference of their respective generator output current and the mean of the paralleled generator output currents, a plurality of control and indicating circuits each adapted to have energized and deenergized conditions, and a plurality of semiconductor switching means connecting said circuits to said secondaries respectively for switching each of the circuits between energized and deenergized conditions in accordance with variations in the voltage generated by the respective secondary from a first amplitude to a second amplitude corresponding respectively to a first current difference and a second current difference.

13. In an unbalanced current protection system, a plurality of paralleled generators, a plurality of current transformers for corresponding phases of the plurality of generators respectively, circuit means connecting the secondaries of all of the current transformers in series to form a closed loop having a current therein which is substantially equal to the mean parallel generator current, an additional transformer having a primary and a secondary, means connecting said primary across the secondary of the current transformer of one generator, the secondary of the additional transformer providing a sensing voltage which is proportional to the vector difference of the respective generator output current and the mean of the paralleled generator output currents, a control circuit adapted to have energized and deenergized conditions, and semiconductor switching means connecting said control circuit to said last-named secondary for switching the control circuit between energized and deenergized conditions in accordance with variations in the voltage generated by the last-named secondary from a first amplitude to a second amplitude corresponding respectively to a first current difference and a second current difference.

References Cited by the Examiner
UNITED STATES PATENTS 2,974,257 3/1961 Flugstad.
3,210,556 10/1965 Billing _____ 307—87

ORIS L. RADER, *Primary Examiner.*

T. B. JOIKE, *Assistant Examiner.*